United States Patent
Chandak et al.

(10) Patent No.: US 11,142,600 B2
(45) Date of Patent: Oct. 12, 2021

(54) ETHYLENE/1-HEXENE COPOLYMER

(71) Applicant: Univation Technologies, LLC, Houston, TX (US)

(72) Inventors: Swapnil B. Chandak, Pearland, TX (US); Peter S. Martin, Houston, TX (US); Yi Zhang, Hopkinton, MA (US)

(73) Assignee: Univation Technologies, LLC, Houston, TX (US)

(*) Notice: Subject to any disclaimer, the term of this patent is extended or adjusted under 35 U.S.C. 154(b) by 0 days.

(21) Appl. No.: 16/968,401

(22) PCT Filed: Mar. 11, 2019

(86) PCT No.: PCT/US2019/021540
§ 371 (c)(1),
(2) Date: Aug. 7, 2020

(87) PCT Pub. No.: WO2019/182779
PCT Pub. Date: Sep. 26, 2019

(65) Prior Publication Data
US 2020/0399407 A1 Dec. 24, 2020

Related U.S. Application Data

(60) Provisional application No. 62/644,757, filed on Mar. 19, 2018.

(51) Int. Cl.
| | | |
|---|---|---|
| *C08F 210/16* | (2006.01) | |
| *C08F 210/14* | (2006.01) | |
| *C08F 4/659* | (2006.01) | |
| *C08F 4/6592* | (2006.01) | |

(52) U.S. Cl.
CPC .......... *C08F 210/16* (2013.01); *C08F 210/14* (2013.01); *C08F 4/65912* (2013.01); *C08F 4/65916* (2013.01); *C08F 4/65925* (2013.01); *C08F 2500/03* (2013.01); *C08F 2500/06* (2013.01); *C08F 2500/07* (2013.01); *C08F 2500/12* (2013.01); *C08F 2500/13* (2013.01)

(58) Field of Classification Search
CPC .... C08F 10/16; C08F 210/14; C08F 2500/02; C08F 2500/03; C08F 2500/07; C08F 2500/06; C08F 2500/12; C08F 2500/13; C08F 4/65912; C08F 4/65916; C08F 4/65925
USPC .......................................................... 526/170
See application file for complete search history.

(56) References Cited

U.S. PATENT DOCUMENTS

| | | |
|---|---|---|
| 3,709,853 A | 1/1973 | Karapinka |
| 4,003,712 A | 1/1977 | Miller |
| 4,011,382 A | 3/1977 | Levine et al. |
| 4,302,566 A | 11/1981 | Karol et al. |
| 4,453,399 A | 6/1984 | Thompson |
| 4,543,399 A | 9/1985 | Jenkins, III et al. |
| 4,588,790 A | 5/1986 | Jenkins, III et al. |
| 4,665,208 A | 5/1987 | Welborn, Jr. et al. |
| 4,874,734 A | 10/1989 | Kioka et al. |
| 4,882,400 A | 11/1989 | Dumain et al. |
| 4,908,463 A | 3/1990 | Bottelberghe |
| 4,924,018 A | 5/1990 | Bottelberghe |
| 4,952,540 A | 8/1990 | Kioka et al. |
| 4,968,827 A | 11/1990 | Davis |
| 4,988,783 A | 1/1991 | Beran et al. |
| 4,994,534 A | 2/1991 | Rhee et al. |
| 5,091,352 A | 2/1992 | Kioka et al. |
| 5,103,031 A | 4/1992 | Smith, Jr. |
| 5,157,137 A | 10/1992 | Sangokoya |
| 5,204,419 A | 4/1993 | Tsutsui et al. |
| 5,206,199 A | 4/1993 | Kioka et al. |
| 5,235,081 A | 8/1993 | Sangokoya |
| 5,248,801 A | 9/1993 | Sangokoya |
| 5,308,815 A | 5/1994 | Sangokoya |
| 5,329,032 A | 7/1994 | Tran et al. |
| 5,352,749 A | 10/1994 | DeChellis et al. |
| 5,391,529 A | 2/1995 | Sangokoya |
| 5,391,793 A | 2/1995 | Marks et al. |
| 5,462,999 A | 10/1995 | Griffin et al. |
| 5,541,270 A | 7/1996 | Chinh et al. |
| 5,627,242 A | 5/1997 | Jacobsen et al. |
| 5,665,818 A | 9/1997 | Tilston et al. |
| 5,677,375 A | 10/1997 | Rifi et al. |
| 5,693,838 A | 12/1997 | Sangokoya et al. |
| 6,489,408 B2 | 12/2002 | Mawson et al. |

(Continued)

FOREIGN PATENT DOCUMENTS

| | | |
|---|---|---|
| BE | 839380 | 9/1976 |
| EP | 0561476 | 9/1993 |

(Continued)

OTHER PUBLICATIONS

Williams, "The Construction of a Polyethylene Calibration Curve for Gel Permeation Chromatography Using Polystyrene Fractions" J. Polym. Sci. Polym. Let, 1968, p. 621, vol. 6.

(Continued)

*Primary Examiner* — William K Cheung

(57) ABSTRACT

An ethylene/1-hexene copolymer has a density from 0.9541 to 0.9600 gram per cubic centimeter (g/cm$^3$), a molecular mass dispersity ($Ð_M=M_w/M_n$) from greater than 2.0 to 3.5; and a Z-average molecular weight (Mz) from 120,000 to 240,000 grams per mole (g/mol). Methods of making and using same. Articles containing same.

10 Claims, No Drawings

(56) References Cited

U.S. PATENT DOCUMENTS

| | | |
|---|---|---|
| 7,875,690 B2 | 1/2011 | Graham et al. |
| 8,067,518 B2 | 11/2011 | Davey et al. |
| 8,378,043 B2 | 2/2013 | Graham et al. |
| 8,481,666 B2 | 7/2013 | Michie et al. |
| 8,486,323 B2 | 7/2013 | Davis et al. |
| 9,663,642 B2 | 5/2017 | Pepper et al. |
| 9,765,164 B2 | 9/2017 | Kababik et al. |
| 9,873,958 B2 | 1/2018 | Pepper et al. |
| 2004/0171857 A1 | 9/2004 | Wang |
| 2005/0256271 A1* | 11/2005 | Lustiger .............. C08L 23/0815 525/240 |
| 2013/0209707 A1 | 8/2013 | Sandkuehler et al. |
| 2013/0338323 A1 | 12/2013 | Michie, Jr. et al. |
| 2014/0248811 A1 | 9/2014 | Degroot et al. |
| 2015/0376311 A1 | 12/2015 | Kababik et al. |

FOREIGN PATENT DOCUMENTS

| | | |
|---|---|---|
| EP | 0594218 | 4/1994 |
| EP | 0279586 B1 | 5/1994 |
| EP | 0649992 | 4/1995 |
| EP | 0794200 A2 | 9/1997 |
| EP | 0634421 B1 | 10/1997 |
| EP | 0802202 | 10/1997 |
| EP | 1891124 | 2/2008 |
| JP | 09194537 | 7/1997 |
| WO | 199410180 | 5/1994 |
| WO | 2008002524 A2 | 1/2008 |

OTHER PUBLICATIONS

PCT/US2019/021540, International Search Report and Written Opinion dated Jun. 17, 2019.

* cited by examiner

ETHYLENE/1-HEXENE COPOLYMER

The present application is a 35 U.S.C. § 371 national stage application of PCT International Application Serial No. PCT/US2019/021540, filed on Mar. 11, 2019, which itself claims priority to U.S. Provisional Patent Application Ser. No. 62/644,757, filed Mar. 19, 2018, the entire contents of which are incorporated by reference herein as if set forth in its entirety.

FIELD

An ethylene/1-hexene copolymer, methods of making and using same, and articles containing same.

INTRODUCTION

Patent application publications and patents in the Field include US 2014/0248811 A1; US 2013/0209707 A1; U.S. Pat. No. 7,875,690 B2; U.S. Pat. No. 8,067,518 B2; U.S. Pat. No. 8,378,043 B2; U.S. Pat. No. 8,486,323 B2; U.S. Pat. No. 9,663,642 B2; U.S. Pat. No. 9,765,164 B2; and U.S. Pat. No. 9,873,958B2.

Polyethylene articles, when subjected to tensile stress less than its short-term mechanical strength in an operating environment, may develop external or internal cracks. The cracks propagate in the polyethylene and eventually cause the article to crack and fail.

Environmental stress crack resistance (ESCR) or slow crack growth (SCG) resistance of a polyethylene is the ability of the polyethylene to resist such tensile stress cracking. ESCR may be measured by contacting a test sample of the polyethylene with a surface active wetting agent, and then subjecting the resulting surface-wetted test sample to a tensile stress less than its short-term mechanical strength. The surface active wetting agent may be an alcohol, soap or surfactant. The surface active wetting agent does not chemically react with the polyethylene, but helps initiate microscopic fractures in the polyethylene that would not otherwise occur within the same time period in the absence of the surface active wetting agent.

SUMMARY

We recognized a problem with prior Ziegler-Natta catalyst derived polyethylene resins characterized by density and ESCR. The higher density polyethylene resin had significantly worse ESCR. The lower density resin had better ESCR. The worsening of ESCR we observed for the higher density resin weakens the resistance of the articles made therefrom to slow crack growth.

We discovered and provide here an ethylene/1-hexene copolymer having, at substantially the same density as that of a comparative ethylene/1-hexene copolymer, increased ESCR relative to the comparative copolymer. The ethylene/1-hexene copolymer has a density from 0.9541 to 0.9600 gram per cubic centimeter (g/cm$^3$), a molecular mass dispersity ($Đ_M$, wherein $Đ_M=M_w/M_n$) from greater than 2.0 to 3.5; and a Z-average molecular weight (Mz) from 120,000 to 240,000 grams per mole (g/mol). The ethylene/1-hexene copolymer is made with a hafnocene catalyst in a gas phase reactor by a gas phase polymerization process, wherein the hafnocene catalyst is made by contacting bis(n-propylcyclopetadienyl) hafnium dichloride or dimethyl with an activator.

We also provide a method of making the ethylene/1-hexene copolymer, a method manufacturing articles comprising the ethylene/1-hexene copolymer, manufactured articles containing or made from the ethylene/1-hexene copolymer, and use of the manufactured article.

DETAILED DESCRIPTION

The Introduction, Summary and Abstract are incorporated here by reference.

Certain inventive embodiments are described below as numbered aspects for easy cross-referencing. Additional embodiments are described elsewhere herein.

Aspect 1. An ethylene/1-hexene copolymer that has a density from 0.9541 to 0.9600 gram per cubic centimeter (g/cm$^3$), as measured by ASTM D792-13, a molecular mass dispersity $Đ_M$ (wherein $Đ_M=M_w/M_n$) from greater than 2.0 to 3.5, as measured by Gel Permeation Chromatography (GPC) Method (described later); and a Z-average molecular weight (Mz) from 80,000 to 240,000 grams per mole (g/mol), as measured by the GPC Method.

Aspect 2. The ethylene/1-hexene copolymer of aspect 1 characterized by any one of limitations (i) to (vii): (i) a density from 0.9541 to 0.9583 g/cm$^3$, alternatively 0.9547 to 0.9581 g/cm$^3$, alternatively 0.9548 to 0.9580 g/cm$^3$, alternatively 0.9549 to 0.9579 g/cm$^3$, alternatively 0.9579±0.0010 g/cm$^3$, alternatively 0.9549±0.0010 g/cm$^3$, 0.9579±0.0010 g/cm$^3$, alternatively 0.9549±0.0010 g/cm$^3$, as measured by ASTM D792-13; (ii) a $Đ_M$ from 2.5 to 3.5, alternatively 2.55 to 3.0, alternatively 2.60 to 2.90, alternatively 2.70 to 2.80, alternatively 2.74±0.050, as measured by the GPC Method; (iii) a Mz from 110,000 to 240,000 g/mol, 121,000 to 229,000 g/mol, alternatively from 130,000 to 226,000 g/mol, alternatively 132,720±5,000 g/mol, alternatively 224,525±9,000 g/mol, as measured by the GPC Method; (iv) both limitations (i) and (ii); (v) both limitations (i) and (iii); (vi) both limitations (ii) and (iii); and (vii) each of limitations (i) to (iii).

Aspect 3. The ethylene/1-hexene copolymer of aspect 1 or 2 characterized by a melt index ("$I_2$") from 1.5 to 40 grams per 10 minutes (g/10 min.), alternatively 1.5 to 20 g/10 min., alternatively 1.5 to 10 g/10 min., alternatively 1.7±0.10 g/10 min., alternatively 9.00±0.50 g/10 min., as measured by ASTM D1238-13 (190° C., 2.16 kg, "$I_2$").

Aspect 4. The ethylene/1-hexene copolymer of any one of aspects 1 to 3 characterized by any one of limitations (i) to (vii): (i) a melt flow rate from 4 to 25 g/10 min., alternatively 4.4±0.20 g/10 min., alternatively 23.4±1.0 g/10 min., as measured by ASTM D1238-13 (190° C., 5.0 kg, "$I_5$"); (ii) a high-load melt flow rate ("HLMFR") from 20 to 200 g/10 min., alternatively 30±10 g/10 min., alternatively 155±10 g/10 min., as measured by ASTM D1238-13 (190° C., 21.6 kg, "$I_{21}$"); (iii) a flow rate ratio, $I_{21}/I_2$, of 15 to 20, alternatively 16 to 19, alternatively 17 to 18, alternatively 17.2±0.50, wherein $I_{21}$ and $I_2$ are measured by ASTM D1238-13 (190° C., 21.6 kg and 2.16 kg, respectively); (iv) a flow rate ratio, $I_{21}/I_5$, of 4 to 10, alternatively 5 to 8, alternatively 6 to 7, alternatively 6.7±0.50, wherein $I_{21}$ and $I_5$ are measured by ASTM D1238-13 (190° C., 21.6 kg and 5.0 kg, respectively); (v) both limitations (i) and (ii); (vi) both limitations (iii) and (iv); and (vii) each of limitations (i) to (iv).

Aspect 5. The ethylene/1-hexene copolymer of any one of aspects 1 to 4 characterized by any one of limitations (i) to (iii): (i) an environmental stress crack resistance (ESCR) F50 of greater than 11 hours, alternatively greater than 15 hours, alternatively 15 to 25 hours, as measured according to ASTM D1693-15 in 10 weight percent (wt %) Igepal CO-630 in water at 50° C.; (ii) a 2% Flexural Secant Modulus from 930 to 1140 megapascals (MPa), alternatively from 950 to 1120 MPa, alternatively from 980 to 1100 MPa, as measured according to ASTM D790-17; and (iii) both (i) and (ii). In some aspects the ESCR F50 (10% Igepal) is related to density by equation (1): ESCR≥2402 hours−2502*d hours (1), wherein − indicates subtraction, * indicates multiplication, and d is the numerical value of density (unitless) of the ethylene/1-hexene copolymer.

Aspect 6. A method of making the ethylene/1-hexene copolymer of any one of aspects 1 to 5, the method comprising contacting ethylene (monomer) and 1-hexene (comonomer) with the single hafnocene catalyst in a single gas phase reactor operating a single gas phase polymerization process to give the ethylene/1-hexene copolymer, wherein the polymerization reaction is conducted under effective gas phase polymerization conditions, and wherein the hafnocene catalyst is made by contacting bis(n-propylcyclopetadienyl) hafnium dichloride or bis(n-propylcyclopetadienyl)hafnium dimethyl with an activator. The contacting may be characterized by any one of limitations (i) to (iii): (i) the bis(n-propylcyclopetadienyl)hafnium dichloride or dimethyl and the activator are premixed in a separate mixing vessel, and the resulting catalyst premixture is then fed into the polymerization reactor; (ii) the bis(n-propylcyclopetadienyl)hafnium dichloride or dimethyl and the activator are contacted with each other just before entering the polymerization reactor, such as for example contacted together in a feedline inletting into the reactor; and (iii) the bis(n-propylcyclopetadienyl)hafnium dichloride or dimethyl and the activator are fed separately via separate inlet locations into the polymerization reactor, thereby making the single hafnocene catalyst in situ. In the embodiment (ii) the bis(n-propylcyclopetadienyl)hafnium dichloride or dimethyl and the activator may be contacted with each other and, optionally an alkanes or alkarene solvent (e.g., hexanes, heptane, toluene, mineral oil), but not with olefin monomer, for from >0 to 5 minutes, alternatively from >0 to 3 minutes, alternatively from >0 to 1 minute, to form the catalyst premixture, and then the catalyst premixture is contacted with the ethylene and optionally ($C_3$-$C_{20}$)alpha-olefin in the polymerization reactor. In some aspects externally-sourced $H_2$ is not added to the reactor. In other aspects the gas phase polymerization conditions further comprise adding externally-sourced $H_2$ into the reactor.

Aspect 7. The method of aspect 6 characterized by any one of limitations (i) to (viii): (i) externally-sourced (from outside the reactor) molecular hydrogen gas ($H_2$) is not added into the polymerization reactor and is not present during the contacting step of the method; (ii) the method further comprises adding externally-sourced $H_2$ gas into the polymerization reactor during the contacting step of the method; (iii) the method further comprises a ($C_4$) or ($C_{8-20}$) alpha-olefin (second comonomer) and makes an ethylene/1-hexene/($C_4$) or ($C_{8-20}$)alpha-olefin copolymer, which contains monomeric constituent units that are derived from ethylene, comonomeric constituent units that are derived from 1-hexene, and comonomeric constituent units that are derived from the ($C_4$) or ($C_{8-20}$)alpha-olefin; (iv) the method is free of any monomer and comonomer except the ethylene and 1-hexene and makes an ethylene/1-hexene copolymer having constitutional units consisting of ethylenic and 1-hexenic units; (v) both (i) and (iii); (vi) both (ii) and (iii); (vii) both (i) and (iv); and (viii) both (ii) and (iv). Without wishing to be bound by theory, it is believed that the ethylene/1-hexene copolymer made by the inventive method has, at substantially the same density as that of a comparative ethylene/1-hexene copolymer, increased ESCR relative to that of the comparative ethylene/1-hexene copolymer.

Aspect 8. The method of aspect 6 or 7 comprising a gas phase polymerization optionally in the presence of added external molecular hydrogen gas ($H_2$), optionally in the presence of an induced condensing agent (ICA); a reaction temperature from 60 degrees (°) to 120° Celsius (C.), alternatively from 80° to 110° C.; and a molar ratio of the molecular hydrogen gas to the ethylene (H2/C2 molar ratio) from 0.001 to 0.050; and a molar ratio of the comonomer to the ethylene (Comonomer/C2 molar ratio) from 0.005 to 0.10.

Aspect 9. An ethylene/1-hexene copolymer made by the method of aspect 6, 7, or 8.

Aspect 10. A manufactured article comprising a shaped form of the ethylene/1-hexene copolymer of aspect 9. The manufactured article may be selected from: coatings, films, sheets, extruded articles, and injection molded articles, alternatively injection molded articles. The manufactured article may be a coating layer (e.g., of a coated article), pipe, film (e.g., blown film), agricultural film, food packaging, garment bags, grocery bags, heavy-duty sacks, industrial sheeting, pallet and shrink wraps, bags, buckets, freezer containers, lids, and toys.

In any one of aspects 1 to 10, the ethylene/1-hexene copolymer may be characterized by (a) a number-average molecular weight (Mn) of from 11,000 to 51,000 g/mol, alternatively 16,000 to 44,000 g/mol, alternatively 19,000 to 39,000 g/mol, as measured by the GPC Method; (b) a weight-average molecular weight (Mw) of from 41,000 to 119,000 g/mol, alternatively 51,000 to 111,000 g/mol, alternatively 55,000 to 105,000 g/mol, as measured by the GPC Method; or (c) both (a) and (b).

General Definitions

Alkyl: a monovalent radical of a saturated hydrocarbon, which may be straight chain, branched chain, or cyclic, and have at least 1 carbon atom.

Carrier material: a porous particulate solid having pores and surfaces suitable for carrying a catalyst.

Composition: a chemical composition. Arrangement, type and ratio of atoms in molecules and type and relative amounts of molecules in a substance or material.

Compound: a molecule or collection of molecules.

Concentrating: a method of slowly increasing the mass or molar amount of less volatile chemical constituent(s) per unit volume of a continuous mixture comprising more volatile and less volatile chemical constituent(s). The method gradually removes more of the more volatile chemical constituent(s) than the less volatile constituent(s) from the continuous mixture to give a concentrate having a higher mass or molar amount of the less volatile chemical constituent(s) per unit volume than did the continuous mixture. The concentrate may be a precipitated solid.

Consisting essentially of, consist(s) essentially of, and the like. Partially-closed ended expressions that exclude anything that would affect the basic and novel characteristics of that which they describe, but otherwise allow anything else.

Consisting of and consists of. Closed ended expressions that exclude anything that is not specifically described by the limitation that it modifies. In some aspects any one, alternatively each expression "consisting essentially of" or "consists essentially of" may be replaced by the expression "consisting of" or "consists of", respectively.

Polymerize: polymerize a monomer or a monomer and at least one comonomer.

Dry. Anhydrous. A moisture content from 0 to less than 5 parts per million based on total parts by weight. Materials fed to the reactor(s) during a polymerization reaction are dry.

Effective amount: a quantity sufficient to achieve an appreciable beneficial result.

Ethylene: a compound of formula $H_2C=CH_2$.

Ethylene/1-hexene copolymer: A macromolecule, or collection of macromolecules, composed of constitutional units wherein 50 to <100 mole percent (mol %), alternatively 70 to <100 mol %, alternatively 80 to <100 mol %, alternatively 90 to <100 mol %, alternatively 95 to <100 mol %, of such constitutional units are derived from ethylene monomer via polymerization thereof; and at least some, alternatively all of the remaining constitutional units are comonomeric units derived from 1-hexene via polymerization thereof.

Feed. Quantity of a reactant or reagent that is added or "fed" into a reactor. The quantities or "feeds" may be measured, e.g., by metering, to control amounts and relative amounts of the various reactants and reagents in the reactor at any given time.

Feeding. Process of adding a feed into a reactor. In continuous polymerization operation, each feeding independently may be continuous or intermittent.

Film: claimed film properties are measured on 25 micrometers thick monolayer films.

Fumed silica, hydrophobic pre-treated: a reaction product of contacting an untreated fumed silica with a hydrophobing agent to react with surface hydroxyl groups on the untreated fumed silica, thereby modifying the surface chemistry of the fumed silica to give a hydrophobic pre-treated fumed silica. The hydrophobing agent may be silicon based.

Fumed silica, untreated: pyrogenic silica produced in a flame. Consists of amorphous silica powder made by fusing microscopic droplets into branched, chainlike, three-dimensional secondary particles, which agglomerate into tertiary particles. Not quartz.

1-Hexene: a compound of formula $H_2C=C(H)CH_2CH_2CH_2CH_3$.

Hydrophobing agent: an organic or organosilicon compound that forms a stable reaction product with surface hydroxyl groups of fumed silica.

Induced condensing agent (ICA): An inert liquid, such as a liquid alkane, useful for cooling materials in gas phase polymerization reactor(s) (e.g., a fluidized bed reactor).

Inert: Generally, not (appreciably) reactive or not (appreciably) interfering therewith in the inventive polymerization reaction. The term "inert" as applied to a purge gas or ethylene feed means a molecular oxygen ($O_2$) content from 0 to less than 5 parts per million based on total parts by weight of the purge gas or ethylene feed.

Modifier: a composition that alters reactivity, stability, or both of a substance on which the composition acts.

Molecular mass dispersity, $Ð_M$ (pronounced D-stroke M), equals weight-average molecular weight, $M_w$, divided by number average molecular weight, $M_n$. $Ð_M=M_w/M_n$. Also known as molecular weight distribution ($M_w/M_n$), MWD, or polydispersity index.

Quartz: an untreated, nonporous crystalline form of silicon dioxide. Particulate or bulk.

Silica. A particulate form of silicon dioxide that may be amorphous. Crystalline, or gel-like. Includes fused quartz, fumed silica, silica gel, and silica aerogel.

Spray-drying: rapidly forming a particulate solid comprising less volatile chemical constituents via aspiration of a bulk mixture of the less volatile chemical constituents and more volatile chemical constituents through a nebulizer using a hot gas. The particle size and shape of the particulate solid formed by spray-drying may be different than those of a precipitated solid.

Substantially the same density: a first density within $\pm 0.0024$ g/cm$^3$, alternatively within $\pm 0.0021$ g/cm$^3$, alternatively within $\pm 0.0018$ g/cm$^3$, alternatively within $\pm 0.0015$ g/cm$^3$, alternatively within $\pm 0.0012$ g/cm$^3$, alternatively within $\pm 0.0007$ g/cm$^3$ of a second density, wherein the first and second densities are measured under the same conditions according to the Density Test Method (described later) and ASTM D792-13.

Support material: a non-porous particulate solid suitable for hosting on its surfaces a catalyst.

System: an interrelated arrangement of different chemical constituents so as to form a functioning whole.

Transport: movement from place to place. Includes from reactor to reactor, tank to reactor, reactor to tank, and manufacturing plant to storage facility and vice versa.

Materials.

Activator: an alkylalumioxane compound or alkylaluminum compound. The alkylaluminum compound may be a monoalkylaluminum compound, a dialkylaluminum compound, or a trialkylaluminum compound.

Alkylaluminoxane compound: also referred to as alkylaluminoxane or alkylalumoxane, is a product of a partial hydrolysis of a trialkylaluminum compound. The alkylaluminoxane may be a ($C_1$-$C_{10}$)alkylaluminoxane, alternatively a ($C_1$-$C_6$)alkylaluminoxane, alternatively a ($C_1$-$C_4$)alkylaluminoxane, alternatively a ($C_1$-$C_3$)alkylaluminoxane, alternatively a ($C_1$-$C_2$)alkylaluminoxane, alternatively a methylaluminoxane (MAO), alternatively a modified-methylaluminoxane (MMAO). In some aspects the alkylaluminoxane is a MAO. In some embodiments the alkylaluminoxane is supported on untreated silica, such as fumed silica. The alkylaluminoxane may be obtained from a commercial supplier or prepared by any suitable method. Suitable methods for preparing alkylaluminoxanes are well-known. Examples of such preparation methods are described in U.S. Pat. Nos. 4,665,208; 4,952,540; 5,091,352; 5,206,199; 5,204,419; 4,874,734; 4,924,018; 4,908,463; 4,968,827; 5,308,815; 5,329,032; 5,248,801; 5,235,081; 5, 157,137; 5,103,031; 5,391,793; 5,391,529; and 5,693,838; and in European publications EP-A-0 561 476; EP-B1-0 279 586; and EP-A-0 594-218; and in PCT publication WO 94/10180.

Alkylaluminum compound: also referred to as an alkylaluminum. The alkylaluminum compound is of formula (I): (alkyl)$_m$Al(X)$_n$ (I), wherein subscript m is 1, 2, or 3; subscript n is 2, 1, or 0; the sum of subscripts m+n=3; and X is a halide or alkoxide. Each alkyl independently may be a ($C_1$-$C_{10}$)alkyl, alternatively ($C_1$-$C_6$)alkyl, alternatively ($C_1$-$C_4$)alkyl. Each ($C_1$-$C_4$)alkyl may independently be methyl; ethyl; propyl; 1-methylethyl; butyl; 1-methylpropyl; 2-methylpropyl; or 1,1-dimethylethyl. Each halide independently may be chloride or bromide, alternatively chloride. Each alkoxide independently may be a ($C_1$-$C_4$)alkoxide. Each ($C_1$-$C_4$)alkoxide may independently be methoxide; ethoxide; propoxide; 1-methylethoxide; butoxide; 1-methylpropoxide; 2-methylpropoxide; or 1,1-dimethylethoxide. The monoalkylaluminum (subscript m is 1 and subscript n is 2 in formula (I)) may be ethylaluminum dichloride (EADC). The dialkylaluminum compound (subscript m is 2 and subscript n is 1 in formula (I)) may be diethylaluminum chloride (DEAC), diethylaluminum ethoxide (DEAE), or a combination or mixture of any two or more thereof. The trialkylaluminum (subscript m is 3 and subscript n is 0 in formula (I)) may be a compound of formula (($C_1$-$C_{10}$)alkyl)$_3$Al, wherein each ($C_1$-$C_{10}$)alkyl group is independently selected. The trialkylaluminum may be trimethylaluminum, triethylaluminum ("TEAl"), tripropylaluminum, tris(1-methylethyl)aluminum, tributylaluminum, tris(2-methylpropyl)aluminum ("TiBAl"), tripentylaluminum, trihexylaluminum ("TnHAl"), trioctylaluminum, or a combination of any two or more thereof. In some aspects the trialkylaluminum is TiBAl. TiBAl is of formula $((CH_3)_2C(H)CH_2)_3Al$.

Alpha-olefin. A compound of formula (I): $H_2C=C(H)$—R (I), wherein R is a straight chain alkyl group. Typically the R group has at least 1, alternatively at least 2 carbon atoms and at most 40, alternatively at most 30, alternatively at most 18 carbon atoms. R may be a $(C_1-C_{18})$ alkyl group, which is a monovalent unsubstituted saturated hydrocarbon having from 1 to 18 carbon atoms. Examples of R are methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, and octadecyl. In some embodiments the $(C_3-C_{20})$alpha-olefin is 1-propene, 1-butene, 1-hexene, or 1-octene; alternatively 1-butene, 1-hexene, or 1-octene; alternatively 1-butene or 1-hexene; alternatively 1-butene or 1-octene; alternatively 1-hexene or 1-octene; alternatively 1-butene; alternatively 1-hexene; alternatively 1-octene; alternatively a combination of any two of 1-butene, 1-hexene, and 1-octene.

Carrier material. The carrier material may be untreated or treated with a hydrophobing agent. The untreated carrier material may be a porous untreated silica and have variable surface area, pore volume, and average particle size. Each of the above properties are measured using conventional techniques known in the art. The untreated silica may be amorphous silica (not quartz), alternatively a high surface area amorphous silica (e.g., from 500 to 1000 $m^2/g$), alternatively a high surface area fumed silica. Such silicas are commercially available from a number of sources. The silica may be in the form of spherical particles, which are obtained by a spray-drying process. The untreated silica may be calcined (i.e., dehydrated) or not calcined. The treated carrier material is made by treating an untreated carrier material with the hydrophobing agent. The treated carrier material may have different surface chemistry properties and/or dimensions than the untreated carrier material.

Hafnocene catalyst: an olefin polymerization catalytically active material that comprises or is made from bis(propylcyclopentadienyl)hafnium dichloride or dimethyl. Bis(propylcyclopentadienyl)hafnium dichloride or dimethyl is a compound of formula $(PrCp)_2HfCl_2$ or $(PrCp)_2Hf(CH_3)_2$, respectively, wherein PrCp is a propylcyclopentadienyl anion of formula $CH_3CH_2CH_2-[C_5H_4^{-1}]$. The bis(propylcyclopentadienyl)hafnium dichloride may be synthesized by contacting 2 mole equivalents of propylcyclopentadiene with 2 mole equivalents of an alkyl lithium in an aprotic solvent under conditions sufficient to make 2 mole equivalents of propylcyclopentadienyl anion. Then the 2 mole equivalents of the propylcyclopentadienyl anion may be contacted with 1 mole equivalent of hafnium tetrachloride in an aprotic solvent under conditions sufficient to make 1 mole equivalent of the bis(propylcyclopentadienyl)hafnium dichloride, and 2 mole equivalents of lithium chloride as a by-product. The 1 mole equivalent of the bis(propylcyclopentadienyl)hafnium dimethyl may be made by contacting the bis(propylcyclopentadienyl)hafnium dichloride with 2 mole equivalents of methyl lithium in an aprotic solvent under conditions sufficient to make 1 mole equivalent of the bis(propylcyclopentadienyl)hafnium dimethyl, and another 2 mole equivalents of lithium chloride as a by-product. The propylcyclopentadiene may be obtained from a commercial source or synthesized by any suitable well known method for making alkylcyclopentadienes. The methyl lithium may be replaced with another alkyl lithium, such as ethyl lithium, propyl lithium, butyl lithium, or the like, when synthesizing a bis(propylcyclopentadienyl)hafnium dialkyl that is a diethyl, dipropyl, dibutyl, or the like, respectively, for use in place of the bis(propylcyclopentadienyl)hafnium dimethyl herein. The aprotic solvent may be an alkane(s) or an alkyl ether. The alkanes may be hexanes, heptane, cycloheptane, or a mineral oil. The alkyl ether may be diethyl ether, tetrahydrofuran, or 1-4-dioxane. The conditions sufficient to make the foregoing compounds may be an inert gas atmosphere, a suitable temperature, and appropriate techniques for handling air and/or moisture sensitive reactions such as Schlenk line techniques. The inert gas of the inert gas atmosphere may be a gas of anhydrous molecular nitrogen, helium, argon, or a combination of any two or more thereof. The suitable temperature may be from $-100°$ to $25°$ C., alternatively from $-78°$ to $5°$ C., alternatively from $-50°$ to $-5°$ C.

The hafnocene catalyst: may be free of a support material such as $MgCl_2$ and free of a carrier material such as an alumina, clay, or silica. Such a homogeneous system may comprise a solution of the hafnocene catalyst in an aprotic hydrocarbon liquid such as a $(C_5-C_{12})$alkane, a mineral oil, an alkarene (e.g., toluene or xylenes), or a mixture of any two or more thereof. Alternatively, the hafnocene catalyst may be a heterogeneous system comprising a supported or spray-dried, alternatively a spray-dried form of the bis(n-propylcyclopetadienyl)hafnium dichloride or dimethyl on finely-divided solid that is a support material such as $MgCl_2$ and/or a carrier material such as an alumina, clay, or silica and the activator.

The hafnocene catalyst and method may be free of zirconium.

The hafnocene catalyst may further comprise metal carboxylate salt, wherein the metal carboxylate salt is represented by the formula: $MQ_x(O_2CR)_y$, wherein M is a metal atom of Group 2 or Group 13 of the Periodic table of Elements; Q is a halogen, hydroxy, alkyl, alkoxy, aryloxy, siloxy, silane, or sulfonate group; R is a $(C_5-C_{30})$hydrocarbyl; subscript x is an integer from 0 to 3; subscript y is an integer from 1 to 4; and the sum of subscripts x and y is equal to the valence of M. In some aspects M is a metal atom of Group 2, alternatively Mg or Ca, alternatively Mg, alternatively Ca, alternatively a metal atom of Group 13, alternatively B or Al, alternatively B, alternatively Al. In some aspects Q is a halogen; alternatively hydroxy; alternatively alkyl, alkoxy, or aryloxy; alternatively alkyl; alternatively alkoxy; alternatively aryloxy; alternatively siloxy or silane; alternatively siloxy; alternatively silane; alternatively sulfonate group. In some aspects subscript x is an integer from 0 to 2, alternatively 1 to 3, alternatively 1 or 2, alternatively 2 or 3, alternatively 0, alternatively 1, alternatively 2, alternatively 3. In some aspects subscript y is an integer from 1 to 3, alternatively 2 to 4, alternatively 1 or 2, alternatively 3 or 4, alternatively 1, alternatively 2, alternatively 3, alternatively 4. In some aspects the sum of subscripts x and y is equal to the valence of M which is equal to 2, alternatively 3.

Hydrophobing agent, silicon-based: an organosilicon compound that forms a stable reaction product with surface hydroxyl groups of a fumed silica. The organosilicon compound may be a polydiorganosiloxane compound or an organosilicon monomer, which contains silicon bonded leaving groups (e.g., Si-halogen, Si-acetoxy, Si-oximo (Si—ON=C<), Si-alkoxy, or Si-amino groups) that react with surface hydroxyl groups of untreated fumed silica to form Si—O—Si linkages with loss of water molecule as a by-product. The polydiorganosiloxane compound, such as a polydimethylsiloxane, contains backbone Si—O—Si groups wherein the oxygen atom can form a stable hydrogen bond to a surface hydroxyl group of fumed silica. The silicon-based hydrophobing agent may be trimethylsilyl chloride, dimethyldichlorosilane, a polydimethylsiloxane fluid, hexamethyldisilazane, an octyltrialkoxysilane (e.g., octyltrimethoxysilane), and a combination of any two or more thereof.

Induced condensing agent or ICA. In some aspects the ICA is a ($C_5$-$C_{20}$)alkane, alternatively a ($C_{11}$-$C_{20}$)alkane, alternatively a ($C_5$-$C_{10}$)alkane. In some aspects the ICA is a ($C_5$-$C_{10}$)alkane. In some aspects the ($C_5$-$C_{10}$)alkane is a pentane, e.g., normal-pentane or isopentane; a hexane; a heptane; an octane; a nonane; a decane; or a combination of any two or more thereof. In some aspects the ICA is isopentane (i.e., 2-methylbutane). The inventive method of polymerization, which uses the ICA, may be referred to herein as being an inert condensing mode operation (ICMO). Concentration in gas phase measured using gas chromatography by calibrating peak area percent to mole percent (mol %) with a gas mixture standard of known concentrations of ad rem gas phase components. Concentration may be from 1 to 10 mol %, alternatively from 3 to 8 mole %. The use of ICA is optional. In some aspects, including some of the inventive examples described later, an ICA is used. For example, in aspects of the method of making a mixture of ICA and catalyst may be fed into a polymerization reactor. In other aspects of the method, use of ICA may be omitted, and a mixed pre-formulated dry catalyst may be fed as such into the polymerization reactor, which lacks ICA.

Polymerization Reactors.

The polymerization method may be conducted in a stirred-bed gas-phase polymerization reactor (SB-GPP reactor) or a fluidized-bed gas-phase polymerization reactor (FB-GPP reactor). In some aspects the polymerization method may use and the reactor may contain an induced condensing agent and the polymerization method may be conducted in condensing mode polymerization such as described in U.S. Pat. Nos. 4,453,399; 4,588,790; 4,994,534; 5,352,749; 5,462,999; and 6,489,408. The gas phase polymerization reactor/method may be a fluidized bed reactor/method as described in U.S. Pat. Nos. 3,709,853; 4,003,712; 4,011,382; 4,302,566; 4,543,399; 4,882,400; 5,352,749; 5,541,270; EP-A-0 802 202; and Belgian Patent No. 839,380. These patents disclose gas phase polymerization processes wherein the polymerization medium is either mechanically agitated or fluidized by the continuous flow of the gaseous monomer and diluent. Other useful gas phase processes include series or multistage polymerization processes such as described in U.S. Pat. Nos. 5,627,242; 5,665,818; 5,677,375; EP-A-0 794 200; EP-B1-0 649 992; EP-A-0 802 202; and EP-B-634421.

In an illustrative embodiment the polymerization method uses a pilot scale fluidized bed gas phase polymerization reactor (Pilot Reactor) that comprises a reactor vessel containing a fluidized bed of a powder of ethylene/alpha-olefin copolymer, and a distributor plate disposed above a bottom head, and defining a bottom gas inlet, and having an expanded section, or cyclone system, at the top of the reactor vessel to decrease amount of resin fines that may escape from the fluidized bed. The expanded section defines a gas outlet. The Pilot Reactor further comprises a compressor blower of sufficient power to continuously cycle or loop gas around from out of the gas outlet in the expanded section in the top of the reactor vessel down to and into the bottom gas inlet of the Pilot Reactor and through the distributor plate and fluidized bed. The Pilot Reactor further comprises a cooling system to remove heat of polymerization and maintain the fluidized bed at a target temperature. Compositions of gases such as ethylene, optionally alpha-olefin, optionally hydrogen, and optionally oxygen being fed into the Pilot Reactor are monitored by an in-line gas chromatograph in the cycle loop in order to maintain specific concentrations that define and enable control of polymer properties. The gases may be cooled, resulting in their temperature dropping below their dew point, at which time the Pilot Reactor is in condensing mode operation (CMO) or induced condensing mode operation (ICMO). In CMO, liquids are present downstream of the cooler and in the bottom head below the distributor plate. The hafnocene catalyst may be fed as a solution, slurry or dry powder into the Pilot Reactor from high pressure devices, wherein the slurry is fed via a syringe pump and the dry powder is fed via a metered disk. The hafnocene catalyst typically enters the fluidized bed in the lower 1/3 of its bed height. The Pilot Reactor further comprises a way of weighing the fluidized bed and isolation ports (Product Discharge System) for discharging the powder of ethylene/alpha-olefin copolymer from the reactor vessel in response to an increase of the fluidized bed weight as polymerization reaction proceeds.

Polymerization Conditions

Polymerizing conditions. Any result effective variable or combination of such variables, such as catalyst composition; amount of reactant; molar ratio of two reactants; absence of interfering materials (e.g., $H_2O$ and $O_2$); or a process parameter (e.g., feed rate or temperature), step, or sequence that is effective and useful for the inventive copolymerizing method in the polymerization reactor(s) to give the inventive ethylene/1-hexene copolymer.

At least one, alternatively each of the polymerizing conditions may be fixed (i.e., unchanged) during production of the inventive polyethylene composition. Such fixed polymerizing conditions may be referred to herein as steady-state polymerizing conditions. Steady-state polymerizing conditions are useful for continuously making embodiments of the inventive polyethylene composition having same polymer properties.

Alternatively, at least one, alternatively two or more of the polymerizing conditions may be varied within their defined operating parameters during production of the inventive polyethylene composition in order to transition from the production of a first embodiment of the inventive polyethylene composition having a first set of polymer properties to a non-inventive polyethylene composition or to a second embodiment of the inventive polyethylene composition having a second set of polymer properties, wherein the first and second sets of polymer properties are different and are each within the limitations described herein for the inventive polyethylene composition. For example, all other polymerizing conditions being equal, a higher molar ratio of 1-hexene/ethylene feeds in the inventive method of copolymerizing produces a lower density of the resulting product inventive polyethylene composition. Transitioning from one set to another set of the polymerizing conditions is permitted within the meaning of "polymerizing conditions" as the operating parameters of both sets of polymerizing conditions are within the ranges defined therefore herein. A beneficial consequence of the foregoing transitioning is that any described property value for the inventive ethylene/1-hexene copolymer may be achieved by a person of ordinary skill in the art in view of the teachings herein.

The polymerizing conditions for gas phase reactors/methods may further include one or more additives such as a chain transfer agent, a promoter, or a scavenging agent. The chain transfer agents are well known and may be alkyl metal such as diethyl zinc. Promoters are well known such as in U.S. Pat. No. 4,988,783 and may include chloroform, $CFCl_3$, trichloroethane, and difluorotetrachloroethane. Scavenging agents may be a trialkylaluminum. Slurry or gas phase polymerizations may be operated free of (not deliberately added) scavenging agents. The polymerizing conditions for gas phase reactors/polymerizations may further include an amount (e.g., 0.5 to 200 ppm based on all feeds into reactor) static control agents and/or continuity additives such as aluminum stearate or polyethyleneimine. Static control agents may be added to the gas phase reactor to inhibit formation or buildup of static charge therein.

The polymerizing conditions may further include using molecular hydrogen to control final properties of the polyethylene composition. Such use of $H_2$ is generally described in Polypropylene Handbook 76-78 (Hanser Publishers, 1996). All other things being equal, using hydrogen can increase the melt flow rate (MFR) or melt index (MI) thereof, wherein MFR or MI are influenced by the concentration of hydrogen. A molar ratio of hydrogen to total monomer ($H_2$/monomer), hydrogen to ethylene ($H_2/C_2$), or hydrogen to comonomer ($H_2/\alpha$-olefin) may be from 0.0001 to 10, alternatively 0.0005 to 5, alternatively 0.001 to 3, alternatively 0.001 to 0.10.

The polymerizing conditions may include a partial pressure of ethylene in the polymerization reactor(s) independently from 690 to 3450 kilopascals (kPa, 100 to 500 pounds per square inch absolute (psia), alternatively 1030 to 2070 kPa (150 to 300 psia), alternatively 1380 to 1720 kPa (200 to 250 psia), alternatively 1450 to 1590 kPa (210 to 230 psia), e.g., 1520 kPa (220 psia). 1.000 psia=6.8948 kPa.

In some aspects the gas-phase polymerization is conducted in a fluidized bed-gas phase polymerization (FB-GPP) reactor under relevant gas phase, fluidized bed polymerization conditions. Such conditions are any variable or combination of variables that may affect a polymerization reaction in the FB-GPP reactor or a composition or property of an ethylene/alpha-olefin copolymer product made thereby. The variables may include reactor design and size, catalyst composition and amount; reactant composition and amount; molar ratio of two different reactants; presence or absence of feed gases such as $H_2$ and/or $O_2$, molar ratio of feed gases versus reactants, absence or concentration of interfering materials (e.g., $H_2O$), absence or presence of an induced condensing agent (ICA), average polymer residence time (avgPRT) in the reactor, partial pressures of constituents, feed rates of monomers, reactor bed temperature (e.g., fluidized bed temperature), nature or sequence of process steps, time periods for transitioning between steps. In performing an inventive method, variables other than that/those being described or changed by the inventive method may be kept constant.

1-Hexene/ethylene gas molar ratio $C_6/O_2$ of comonomer and ethylene being fed into the FB-GPP reactor may be from 0.0001 to 0.1, alternatively from 0.0002 to 0.05, alternatively from 0.0004 to 0.02.

Ethylene partial pressure in the FB-GPP reactor. From 690 to 2070 kilopascals (kPa, i.e., from 100 to 300 psia (pounds per square inch absolute)); alternatively from 830 to 1655 kPa (120 to 240 psia), alternatively from 1300 to 1515 kPa (190 to 220 psia). Alternatively, the partial pressure of ethylene may be from 690 to 3450 kilopascals (kPa, 100 to 500 pounds per square inch absolute (psia)), alternatively 1030 to 2070 kPa (150 to 300 psia), alternatively 1380 to 1720 kPa (200 to 250 psia), alternatively 1450 to 1590 kPa (210 to 230 psia), e.g., 1520 kPa (220 psia). 1.000 psia=6.8948 kPa.

Hydrogen to ethylene (H2/C2) gas molar ratios in the FB-GPP reactor may be from 0.0001 to 0.25, alternatively from 0.0005 to 0.200, alternatively from 0.005 to 0.149, alternatively from 0.009 to 0.109, alternatively from 0.010 to 0.100.

Oxygen ($O_2$) concentration relative to ethylene ("$O_2/C_2$", volume parts $O_2$ per million volume parts ethylene (ppmv)) in the FB-GPP reactor. In some embodiments the $O_2/C_2$ is from 0.0000 to 0.20 ppmv, alternatively from 0.0001 to 0.200 ppmv, alternatively from 0.0000 to 0.183 ppmv, alternatively from 0.0000 to 0.163 ppmv.

Reactor bed temperature in the FB-GPP reactor may be from 90° to 120° C., alternatively from 95° to 115° C., alternatively from 99° to 110° C., alternatively from 100.0° to 109° C.

Residence time, average for polymer (avgPRT). The number of minutes or hours on average the polymer product resides in the FB-GPP reactor. The avgPRT may be from 30 minutes to 10 hours, alternatively from 60 minutes to 5 hours, alternatively from 90 minutes to 4 hours, alternatively from 1.7 to 3.0 hours.

Gas Phase Reactor and Polymerization Method Start-Up or Restart

Start-up or restart of a recommissioned FB-GPP reactor (cold start) or restart of a transitioning FB-GPP reactor (warm start) includes a time period that is prior to reaching steady-state polymerization conditions of step (a). Start-up or restart may include the use of a polymer seedbed preloaded or loaded, respectively, into the fluidized bed reactor. The polymer seedbed may be composed of powder of a polyethylene such as a polyethylene homopolymer or the ethylene/alpha-olefin copolymer.

Start-up or restart of the FB-GPP reactor may also include gas atmosphere transitions comprising purging air or other unwanted gas(es) from the reactor with a dry (anhydrous) inert purge gas, followed by purging the dry inert purge gas from the FB-GPP reactor with dry ethylene gas. The dry inert purge gas may consist essentially of molecular nitrogen ($N_2$), argon, helium, or a mixture of any two or more thereof. When not in operation, prior to start-up (cold start), the FB-GPP reactor contains an atmosphere of air. The dry inert purge gas may be used to sweep the air from a recommissioned FB-GPP reactor during early stages of start-up to give a FB-GPP reactor having an atmosphere consisting of the dry inert purge gas. Prior to restart (e.g., after a change in seedbeds), a transitioning FB-GPP reactor may contain an atmosphere of unwanted ICA or other unwanted gas or vapor. The dry inert purge gas may be used to sweep the unwanted vapor or gas from the transitioning FB-GPP reactor during early stages of restart to give the FB-GPP reactor an atmosphere consisting of the dry inert purge gas. Any dry inert purge gas may itself be swept from the FB-GPP reactor with the dry ethylene gas. The dry ethylene gas may further contain molecular hydrogen gas such that the dry ethylene gas is fed into the fluidized bed reactor as a mixture thereof. Alternatively the dry molecular hydrogen gas may be introduced separately and after the atmosphere of the fluidized bed reactor has been transitioned to ethylene. The gas atmosphere transitions may be done prior to, during, or after heating the FB-GPP reactor to the reaction temperature of the polymerization conditions.

Start-up or restart of the FB-GPP reactor also includes introducing feeds of reactants and reagents thereinto. The reactants include the ethylene and the alpha-olefin. The reagents fed into the fluidized bed reactor include the molecular hydrogen gas and the induced condensing agent (ICA) and the hafnocene-titanocene catalyst system.

In some aspects any compound, composition, formulation, mixture, or reaction product herein may be free of any one of the chemical elements selected from the group consisting of: H, Li, Be, B, C, N, O, F, Na, Mg, Al, Si, P, S, Cl, K, Ca, Sc, Ti, V, Cr, Mn, Fe, Co, Ni, Cu, Zn, Ga, Ge, As, Se, Br, Rb, Sr, Y, Zr, Nb, Mo, Tc, Ru, Rh, Pd, Ag, Cd, In, Sn, Sb, Te, I, Cs, Ba, Hf, Ta, W, Re, Os, Ir, Pt, Au, Hg, Tl, Pb, Bi, lanthanoids, and actinoids; with the proviso that chemical elements required by the compound, composition, formulation, mixture, or reaction product (e.g., Hf required by a hafnocene) are not excluded.

Alternatively precedes a distinct embodiment. ASTM means the standards organization, ASTM International, West Conshohocken, Pa., USA. IUPAC is International Union of Pure and Applied Chemistry (IUPAC Secretariat, Research Triangle Park, N.C., USA). May confers a permitted choice, not an imperative. Operative means functionally capable or effective. Optional(ly) means is absent (or excluded), alternatively is present (or included).

Density Test Method: measured according to ASTM D792-13, *Standard Test Methods for Density and Specific Gravity (Relative Density) of Plastics by Displacement*, Method B (for testing solid plastics in liquids other than water, e.g., in liquid 2-propanol). Report results in units of grams per cubic centimeter (g/cm$^3$).

2% Flexural Secant Modulus Test Method: measured according to ASTM D790-17, *Standard Test Methods for Flexural Properties of Unreinforced and Reinforced Plastics and Electrical Insulating Materials*. Test specimen by 3-point deflection with a standard span of 5.08 cm (2.00 inches) and thickness of 0.32 cm (⅛ inch). Test speed used is 1.27 cm per minute (0.5 inch/min.) with modulus, 1% and 2% secant modulus being recorded. Report results in megapascals (MPa). 1.0000 kilopounds per square inch (ksi)= 6.8948 MPa.

Gel permeation chromatography (GPC) Method: Use a PolymerChar (Valencia, Spain) high temperature Gel Permeation Chromatography system comprising an Infra-red concentration/composition detector (IR-5), a PDI 2040 laser light scattering detector (Agilent) and a four capillary bridge viscometer (Malvern). The carrier solvent is 1,2,4-trichlorobenzene (TCB). Use a solvent delivery pump, on-line solvent degasser, auto-sampler, and column oven from Agilent. Operate the auto-sampler and detector compartments at 160° C. and the column compartment at 150° C. Use 4 Mixed A LS 20 um columns (Agilent). The chromatographic solvent and the sample preparation solvent contained 250 ppm of butylated hydroxytoluene (BHT). Sparge both solvent sources with nitrogen. Semi-automatically prepare polyethylene samples at targeted concentrations of 2.0 mg/mL by weighing samples by computer-controlled balance, and delivering calculated amounts of solvent by the auto-sampler needle. Dissolve samples at 160° C. for 3 hours with gentle agitation. The injection volume is 200 μL and the flowrate is 1.0 mL/minute.

GPC Method Continued: calibrate the GPC column set with 21 narrow molecular weight distribution polystyrene standards. The molecular weights of the standards ranged from 580 to 8,400,000 g/mol, and are arranged in 6 "cocktail" mixtures, with at least a decade of separation between individual molecular weights. Convert polystyrene standard peak molecular weights to polyethylene molecular weights using the equation (1): $M_{pe}=A(M_{ps})B$ (1); wherein $M_{pe}$ is calculated molecular weight of the polyethylene sample, $M_{ps}$ is the molecular weight of the polystyrene standards, B is 1.0, and the experimentally determined value of A is about 0.40 (Reference: T. Williams and I. M. Ward, "*The construction of a polyethylene calibration curve for gel permeation chromatography using polystyrene fractions*" J. Polym. Sci., Polym. Let., 6, 621 (1968)).

GPC Method Continued: use a fifth order polynomial to fit the respective polyethylene-equivalent calibration points obtained from equation (1) above to their observed elution volumes for each polystyrene standard. Calculate Mn, Mw, and Mz for the polyethylene sample according to the following respective equations (2) to (4): $M_n = \Sigma^i Wf_i / \Sigma^i (Wf_i/M_i)$ (2), $M_w = \Sigma^i (Wf_i * M_i) / \Sigma^i Wf_i$ (3), and $M_z = \Sigma^i (Wf_i * M_i^2) / \Sigma^i (Wf_i * M_i)$ (4), wherein * indicates mathematical multiplication and / indicates mathematical division. Accurately determine the A value used in equation (1) by adjusting A value in equation (1) until Mw calculated using equation (3) and the corresponding retention volume polynomial agree with the independently determined value of Mw obtained in accordance with a linear polyethylene homopolymer reference with known weight average molecular weight of 120,000 g/mol.

High-load Melt Flow Rate (190° C., 21.6 kg, "$I_{21}$") Test Method: use ASTM D1238-13, *Standard Test Method for Melt Flow Rates of Thermoplastics by Extrusion Platometer*, using conditions of 190° C./21.6 kilograms (kg). Report results in units of grams eluted per 10 minutes (g/10 min.).

Melt Flow Rate (190° C., 5.0 kg, "$I_5$") Test Method: use ASTM D1238-13, *Standard Test Method for Melt Flow Rates of Thermoplastics by Extrusion Platometer*, using conditions of 190° C./5.0 kilograms (kg). Report results in units of grams eluted per 10 minutes (g/10 min.).

Melt Index (190° C., 2.16 kilograms (kg), "$I_2$") Test Method: measured according to ASTM D1238-13, using conditions of 190° C./2.16 kg, formerly known as "Condition E" and also known as $I_2$. Report results in units of grams eluted per 10 minutes (g/10 min.).

Ethylene ("02"): a monomer; used at the partial pressure of C2 described below.

1-hexene ("06"): a comonomer; used at the molar ratio of C6/C2 described below.

Molecular hydrogen gas ("H2"): used at a molar ratio of H2/C2 described below.

Bis(n-propylcyclopetadienyl)hafnium dichloride may be made as described in U.S. Pat. No. 8,481,666 B2, column 25, lines 9 to 25.

Hafnocene Catalyst 1 (Hf1). Make Hafnocene Catalyst 1 from bis(n-propylcyclopetadienyl)hafnium dichloride according to a procedure described in U.S. Pat. No. 8,481,666 B2, column 25, lines 26 to 42. Add methylaluminoxane (MAO) in toluene into a clean, dry vessel, and stir at from 50 to 80 rotations per minute (rpm) and at a temperature in the range of 15.5° to 37.8° C. Then add additional toluene while stirring. Dissolve the bis(n-propylcyclopetadienyl) hafnium dichloride in an amount of toluene, and add the resulting solution into the vessel with the MAO/toluene. Stir the resulting bis(n-propylcyclopetadienyl)hafnium dichloride/MAO mixture for from 0.5 to 2 hours. Next, add an appropriate amount of silica (average particle size of from 22 to 28 μm, dehydrated at 600° C.) into the mixture, and stir the resulting suspension for 1 or more hours. Then decant liquid from the suspension, and dry the remaining solids at elevated temperature under flowing nitrogen while being stirred to give Hafnocene Catalyst 1 (Hf1). Hf1 has an aluminum-to-hafnium (Al/Hf) molar ratio of from 80:1 to 130:1 and a hafnium loading of from 0.6 to 0.9 wt %, alternatively 0.6 to 0.75 wt %, alternatively 0.75 to 0.9 wt %, alternatively 0.80 to 0.90 wt % Hf based on total weight of Hf1.

Inventive Examples 1 and 2 (IE1 and IE2): gas phase polymerization of ethylene and 1-hexene catalyzed by the Hafnocene Catalyst 1 (Hf1) to give an ethylene/1-hexene copolymer. Employ a gas phase reactor 2 liters, stainless steel autoclave equipped with a mechanical agitator. Dry the reactor for 1 hour, charge dried reactor with 400 g of NaCl, and further dry by heating at 105° C. under nitrogen for 30 minutes. Then add 5 g of SMAO (silica supported methylalumoxane) as a scavenger under nitrogen pressure. After adding SMAO, seal the reactor, and stir reactor contents. Charge the reactor with 1-hexene and optionally hydrogen as specified below. Pressurize the charged reactor with ethylene (total pressure=200 psia). Allow the system to reach a steady state, then charge into the reactor about 20 mg of Hafnocene Catalyst 1 (Hf1). Bring reactor temperature to 85° C., and maintain at 85° C. throughout the experiment run. Maintain a constant C6/C2 molar ratio and ethylene pressure. Allow the polymerization to proceed for 60 minutes. Then cool the reactor, then vent and open it. Wash the resulting contents with water, then methanol, and dry them to give the ethylene/1-hexene copolymers of IE1 and IE2. Operating conditions of polymerization reactor are listed below in Table 1. Measure density, Mw, Mn, Mz, $I_2$, $I_5$, $I_{21}$, ESCR, and flexural secant modulus. Calculate $Đ_M$, $I_{21}/I_2$, and $I_{21}/I_5$ from the measured values. Report data for IE1 and IE2 later in Tables 2 and 3, respectively.

TABLE 1

Operating conditions for making Inventive Example IE1 and IE2.

| Reaction Constituent/Parameter | Gas Phase Polymerizing Condition |
|---|---|
| Catalyst | Activation product of methylalumoxane and bis(n-propylcyclopetadienyl)hafnium dichloride |
| Reactor | single, continuous-mode, fluidized bed |
| Starting seedbed = granular PE resin | Preloaded in reactor |
| Reactor Purging method | Anhydrous $N_2$ gas |
| Ethylene ("C2") | 1379 kPa partial pressure |
| Comonomer = 1-hexene | molar ratio of 1-hexene/C2 = 0.0002 |
| Molecular hydrogen gas ("H2") | molar ratio of H2/C2 = 0.00065 |
| Induced condensing agent 1: isopentane | 6.2 mol % |
| Operating temperature | 85° C. |
| Bed weight | 44 kg |
| Superficial gas velocity (SGV, meters/second) | 0.52 m/s |

Comparative Example 1 (CE1): an ethylene/1-hexene copolymer having the properties reported later in Table 2. Product HD 1090 from Qenos. Made with the Ziegler-Natta catalyst, UCAT™ A from Univation Technologies, LLC, Houston, Tex., USA.

Comparative Example 2 (CE2): an ethylene/1-hexene copolymer having the properties reported later in Table 3. Product DMDA-8904 from The Dow Chemical Company.

Obtain or measure product information about CE1 and CE2 that includes density, Mw, Mn, Mz, $I_2$, $I_5$, $I_{21}$, ESCR, and flexural secant modulus. Calculate $Đ_M$, $I_{21}/I_2$, and $I_{21}/I_5$ from the measured values.

TABLE 2 properties of ethylene/1-hexene copolymers of CE1 and IE1.

| Polymer Property Measured | CE1 | IE1 |
|---|---|---|
| Density (ASTM D792-13) (g/cm$^3$) | 0.9585 | 0.9579 |
| Melt Index $I_2$ (190° C., 2.16 kg, ASTM D1238-04) (g/10 min.) | 9.089 | 9.041 |
| Flow Index $I_5$ (190° C., 5.0 kg, ASTM D1238-04) (g/10 min.) | 25.845 | 23.395 |
| Flow Index $I_{21}$ (190° C., 21.6 kg, ASTM D1238-04) (g/10 min.) | 218.8 | 154.9 |
| Melt Flow Ratio ($I_{21}/I_2$) | 24.1 | 17.1 |
| Melt Flow Ratio ($I_{21}/I_5$) | 8.47 | 6.62 |
| Number-average molecular weight ($M_n$) (g/mol) | 15,807 | 21,564 |
| Weight-average molecular weight ($M_w$) (g/mol) | 64,516 | 59,092 |
| Molecular mass dispersity ($Đ_M = M_w/M_n$) | 4.08 | 2.74 |
| Z-average molecular weight (Mz) (g/mol) | 247,829 | 132,716 |
| ESCR F50 (10 wt % Igepal CO-630 in water at 50° C.) (hours) | 4.09 | 15.85 |
| Avg. 2% Flexural Secant Modulus (MPa) | 1092 | 1089 |

As shown in Table 2, the inventive ethylene/1-hexene copolymers of IE1 has substantially the same density as that of the comparative ethylene/1-hexene copolymer of CE1, and yet surprisingly IE1 has increased ESCR relative to CE1.

TABLE 3 properties of ethylene/1-hexene copolymers of CE2 and IE2.

| Polymer Property Measured | CE2 | IE2 |
|---|---|---|
| Density (ASTM D792-13) (g/cm$^3$) | 0.9538 | 0.9549 |
| Melt Index $I_2$ (190° C., 2.16 kg, ASTM D1238-04) (g/10 min.) | 4.348 | 1.7 |
| Flow Index $I_5$ (190° C., 5.0 kg, ASTM D1238-04) (g/10 min.) | 12.325 | 4.4 |
| Flow Index $I_{21}$ (190° C., 21.6 kg, ASTM D1238-04) (g/10 min.) | 103.6 | 30 |
| Melt Flow Ratio ($I_{21}/I_2$) | 23.8 | 17.3 |
| Melt Flow Ratio ($I_{21}/I_5$) | 8.41 | 6.8 |
| Number-average molecular weight ($M_n$) (g/mol) | 22,551 | 37,545 |
| Weight-average molecular weight ($M_w$) (g/mol) | 87,020 | 103,066 |
| Molecular mass dispersity ($Đ_M = M_w/M_n$) | 3.86 | 2.7 |
| Z-average molecular weight (Mz) (g/mol) | 324,598 | 224,525 |
| ESCR F50 (10 wt % Igepal CO-630 in water at 50° C.) (hours) | 15.85 | 24 |
| Avg. 2% Flexural Secant Modulus (MPa) | 1043 | 988.7 ± 29 |

As shown in Table 3, the inventive ethylene/1-hexene copolymers of IE2 has substantially the same density as that of the comparative ethylene/1-hexene copolymer of CE2, and yet surprisingly IE2 has increased ESCR relative to CE2.

As shown in Tables 2 and 3 the inventive ethylene/1-hexene copolymers have 2% flexural secant modulus performance that makes them well-suited for being injection molded into injection-molded articles.

The invention claimed is:

1. An ethylene/1-hexene copolymer that has a density from 0.9541 to 0.9600 gram per cubic centimeter (g/cm$^3$), as measured by ASTM D792-13, a molecular mass dispersity $Đ_M$ (wherein $Đ_M=M_w/M_n$) from 2.5 to 3.0, as measured by Gel Permeation Chromatography (GPC) Method; and a Z-average molecular weight (Mz) from 80,000 to 240,000 grams per mole (g/mol), as measured by the GPC Method.

2. The ethylene/1-hexene copolymer of claim 1 characterized by any one of limitations (i) to (vii): (i) a density from 0.9541 to 0.9583 g/cm$^3$, as measured by ASTM D792-13; (ii) a Đ$_M$ from 2.55 to 3.0, as measured by the GPC Method; (iii) a Mz from 110,000 to 240,000 g/mol, as measured by the GPC Method; (iv) both limitations (i) and (ii); (v) both limitations (i) and (iii); (vi) both limitations (ii) and (iii); and (vii) each of limitations (i) to (iii).

3. The ethylene/1-hexene copolymer of claim 1 characterized by a melt index ("I$_2$") from 1.5 to 40 grams per 10 minutes (g/10 min), as measured by ASTM D1238-13 (190° C., 2.16 kg, "I$_2$").

4. The ethylene/1-hexene copolymer of claim 1 characterized by any one of limitations (i) to (vii): (i) a melt flow rate from 4 to 25 g/10 min, as measured by ASTM D1238-13 (190° C., 5.0 kg, "I$_5$"); (ii) a high-load melt flow rate ("HLMFR") from 20 to 200 g/10 min, as measured by ASTM D1238-13 (190° C., 21.6 kg, "I$_{21}$"); a flow rate ratio, I$_{21}$/I$_2$, of 15 to 20, wherein I$_{21}$ and I$_2$ are measured by ASTM D1238-13 (190° C., 21.6 kg and 2.16 kg, respectively); (iv) a flow rate ratio, I$_{21}$/I$_5$, of 4 to 10, wherein I$_{21}$ and I$_5$ are measured by ASTM D1238-13 (190° C., 21.6 kg and 5.0 kg, respectively); (v) both limitations (i) and (ii); (vi) both limitations (iii) and (iv); and (vii) each of limitations (i) to (iv).

5. The ethylene/1-hexene copolymer of claim 1 characterized by any one of limitations (i) to (iii): (i) an environmental stress crack resistance (ESCR) F50 of greater than 11 hours, as measured according to ASTM D1693-15 in 10 weight percent (wt %) Igepal CO-630 in water at 50° C.; (ii) a 2% Flexural Secant Modulus from 930 to 1140 megapascals (MPa), as measured according to ASTM D790-17; and (iii) both (i) and (ii).

6. A method of making the ethylene/1-hexene copolymer of claim 1, the method comprising contacting ethylene and 1-hexene with the single hafnocene catalyst in a single gas phase reactor operating a single gas phase polymerization process to give the ethylene/1-hexene copolymer, wherein the polymerization reaction is conducted under effective gas phase polymerization conditions, and wherein the hafnocene catalyst is made by contacting bis(n-propylcyclopetadienyl) hafnium dichloride or bis(n-propylcyclopetadienyl)hafnium dimethyl with an activator.

7. The method of claim 6 characterized by any one of limitations (i) to (viii): (i) externally-sourced (from outside the reactor) molecular hydrogen gas (H$_2$) is not added into the polymerization reactor and is not present during the contacting step of the method; (ii) the method further comprises adding externally-sourced H$_2$ gas into the polymerization reactor during the contacting step of the method; (iii) the method further comprises a (C$_4$) or (C$_{8-20}$)alpha-olefin (second comonomer) and makes an ethylene/1-hexene/(C$_4$) or (C$_{8-20}$)alpha-olefin copolymer, which contains monomeric constituent units that are derived from ethylene, comonomeric constituent units that are derived from 1-hexene, and comonomeric constituent units that are derived from the (C$_4$) or (C$_{8-20}$)alpha-olefin; (iv) the method is free of any monomer and comonomer except the ethylene and 1-hexene and makes an ethylene/1-hexene copolymer having constitutional units consisting of ethylenic and 1-hexenic units; (v) both (i) and (iii); (vi) both (ii) and (iii); (vii) both (i) and (iv); and (viii) both (ii) and (iv).

8. The method of claim 6 comprising a gas phase polymerization optionally in the presence of added external molecular hydrogen gas (H$_2$), optionally in the presence of an induced condensing agent (ICA); a reaction temperature from 60 degrees (°) to 120° Celsius (C.), and a molar ratio of the molecular hydrogen gas to the ethylene (H2/C2 molar ratio) from 0.001 to 0.050.

9. An ethylene/1-hexene copolymer made by the method of claim 6.

10. A manufactured article comprising a shaped form of the ethylene/1-hexene copolymer of claim 9.

\* \* \* \* \*